Dec. 23, 1958 D. W. BYERS 2,865,425
DEVICE FOR MOUNTING AND SEALING FILM TRANSPARENCIES
Original Filed April 30, 1956 3 Sheets-Sheet 1

INVENTOR.
DONALD W. BYERS
BY
Kimmel + Crowell
ATTORNEYS

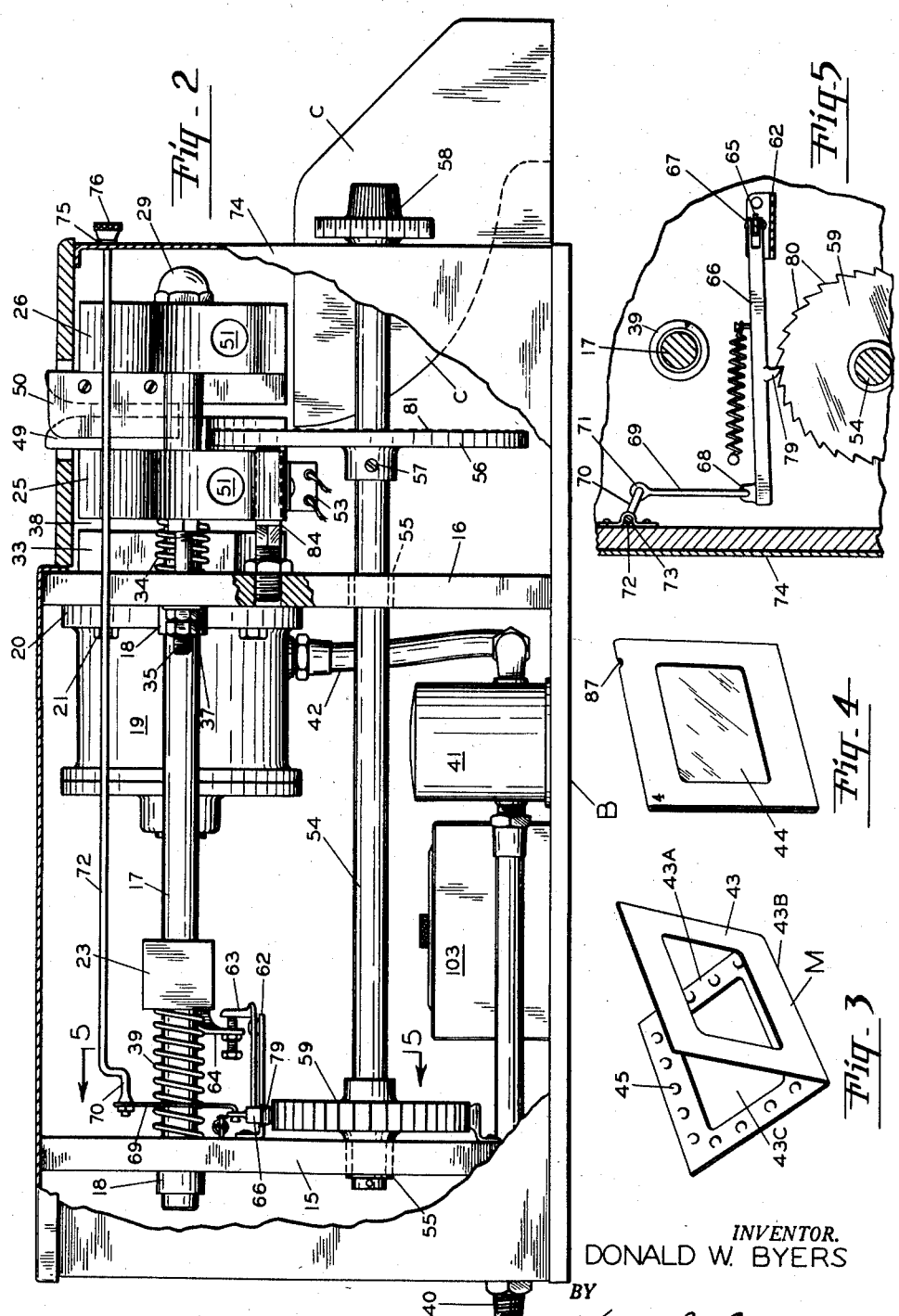

Dec. 23, 1958            D. W. BYERS            2,865,425
DEVICE FOR MOUNTING AND SEALING FILM TRANSPARENCIES
Original Filed April 30, 1956            3 Sheets-Sheet 3
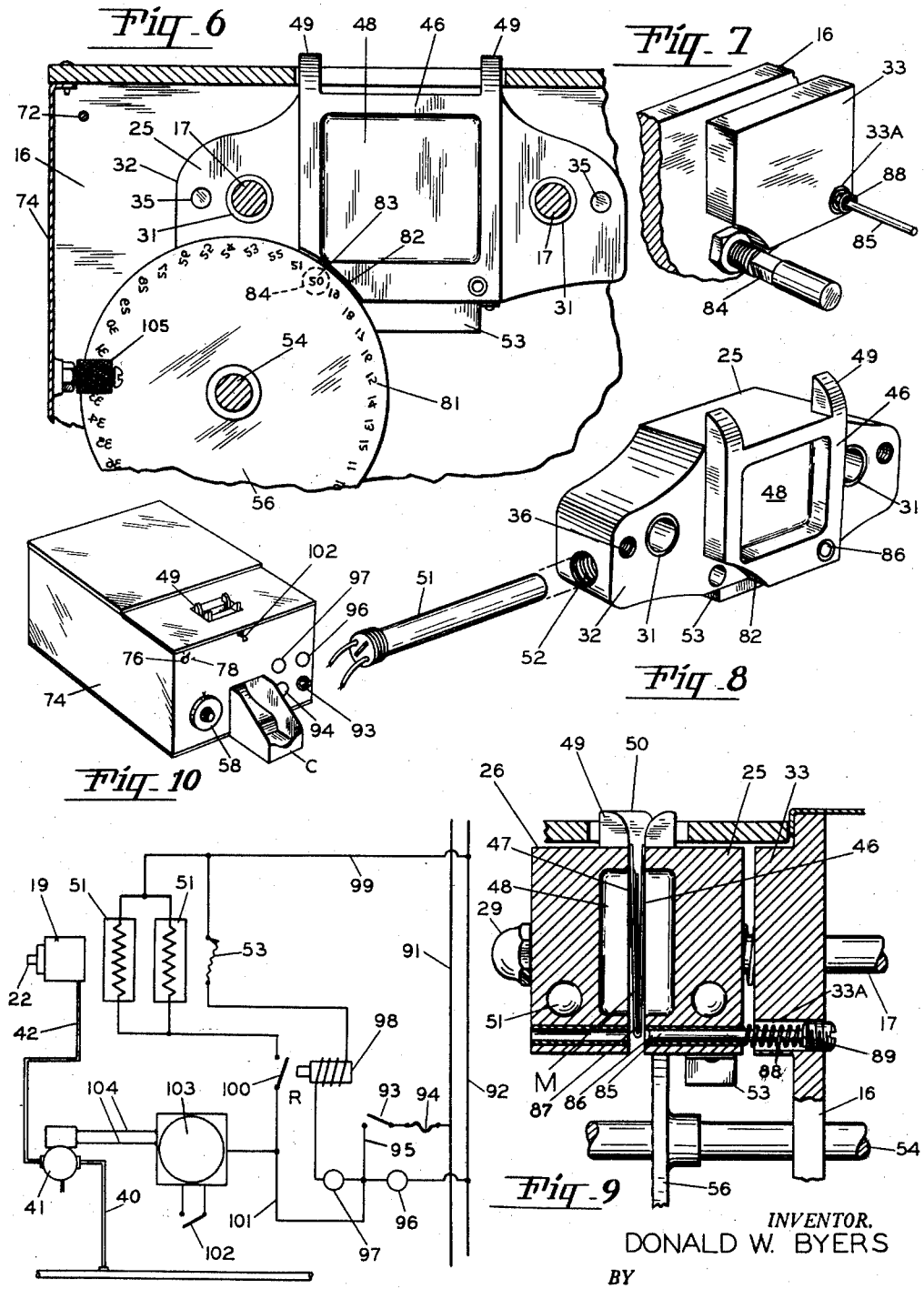
INVENTOR.
DONALD W. BYERS
BY
Kimmel & Crowell
ATTORNEYS

United States Patent Office 2,865,425
Patented Dec. 23, 1958

2,865,425

DEVICE FOR MOUNTING AND SEALING FILM TRANSPARENCIES

Donald W. Byers, Portland, Oreg.

Continuation of application Serial No. 581,778, April 30, 1956. This application February 11, 1958, Serial No. 714,669

11 Claims. (Cl. 154—1.6)

This application is a continuation of my application Serial Number 581,778, filed April 30, 1956, and now abandoned.

The present invention relates to a device for mounting and sealing film transparencies, and more particularly to such a device which is adapted for mounting 35 mm. color film transparencies within slide mounts.

The primary object of the invention is to provide a device for mounting and sealing film transparencies within a slide mount by pressure, preferably pressure under heat.

Another object of the invention is to provide an indicia or numbering mechanism for slide mounts by imprinting the identifying indicia or numbers on the mount by either stamping the same on the mounts by raised letters, or by printing the indicia on the mount with raised letters and ink. In the use of film slide transparencies each slide is preferably numbered so that the slides can be indexed for identification, and by so indexing the slides they can be projected from a projector in a predetermined order.

A further object of the invention is to provide means within the device for notching the edge of the mount so that the operation of the projector can orientate or position the slide mount within the projector in the dark.

With this new and improved device, the transparency may be sealed by heat or pressure within the mount, the mounts may be numbered so as to index the mounts and they may also be notched all in one cycle of operation.

Other objects and advantages will become apparent in the following specification when considered in the light of the attached drawings, in which:

Figure 2 is a side elevation of Figure 1, parts broken away for convenience of illustration.

Figure 3 is a perspective view of a conventional transparency film mount before the film has been mounted in the same.

Figure 4 is a perspective view of the film mounting after the transparency has been sealed in place, the mount numbered and notched.

Figure 5 is a fragmentary enlarged sectional detail view of the feed mechanism for progressing the numbering device, taken on the line 5—5 of Figure 2, looking in the direction of the arrows.

Figure 6 is a transverse section taken on the line 6—6 of Figure 1, looking in the direction of the arrows, and showing the means for mounting film transparencies, looking into one of the heat applying jaws and into the numbering disk.

Figure 7 is a fragmentary perspective view of the face of the back stop for limiting the movement of the heat applying jaw and the limit stop for contacting the rear face of the disk, together with the punch for notching the mount.

Figure 8 is a perspective view of the heat applicator jaw shown in Figure 6, illustrating the heat element withdrawn therefrom.

Figure 9 is a fragmentary enlarged lateral cross-section taken on the line 9—9 of Figure 1, looking in the direction of the arrows.

Figure 10 is a perspective view of the device for mounting film transparency.

Figure 11 is a diagrammatical layout of the device including a wiring diagram.

Figure 1:
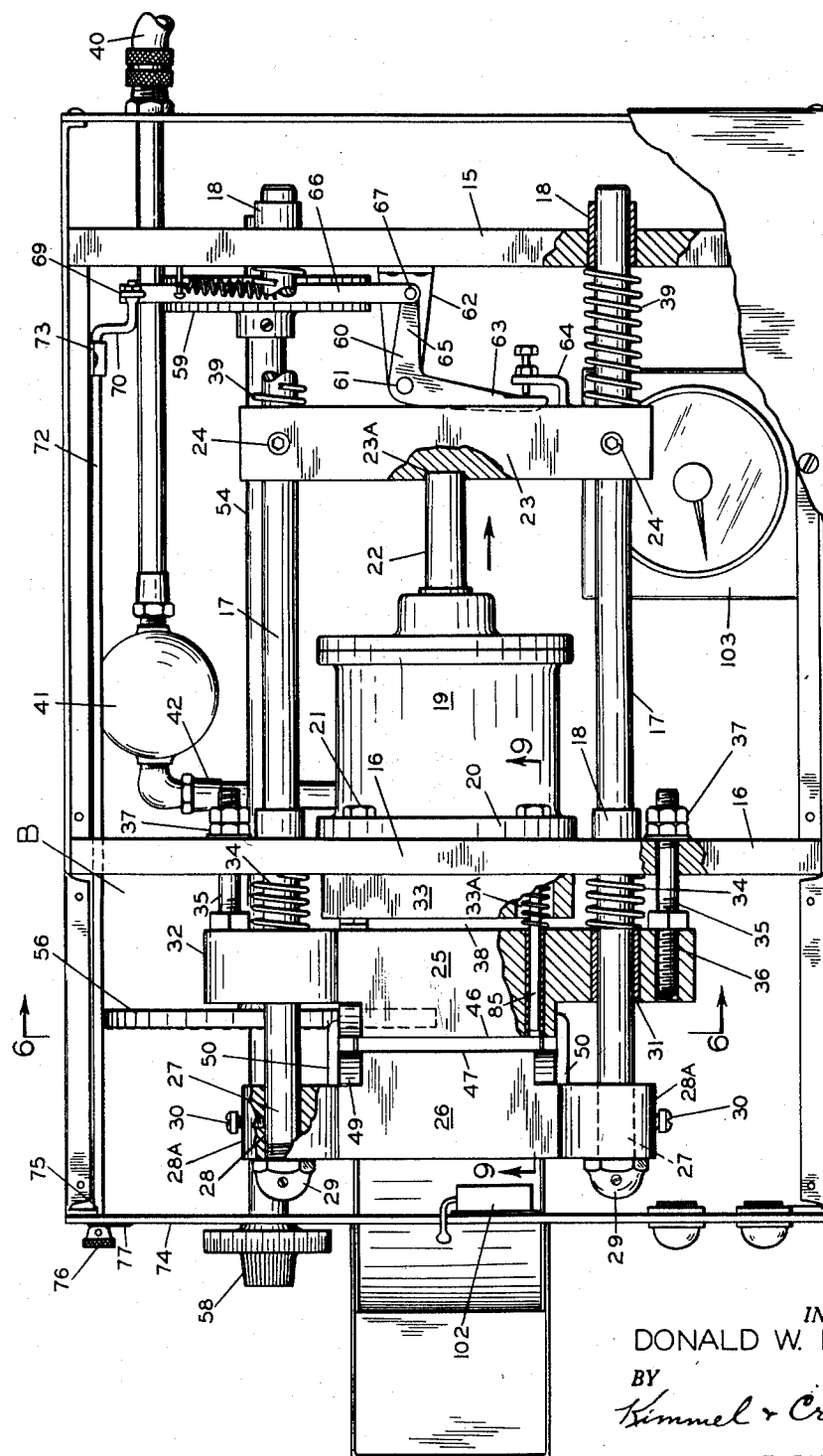
Figure 1 is a plan view of the invention with parts broken away for convenience of illustration.

Referring now to the drawings in detail wherein like reference numerals indicate like parts throughout the several figures, the reference character B indicates generally a base provided with frames 15 and 16 forming part thereof and extending upwardly and transversely thereof. The frames 15 and 16 are adapted to support horizontal rods 17 on bearings 18. An air cylinder 19 is mounted to the side of the frame 16 by base 20 and bolts 21. A piston rod 22 of the cylinder 19 is adapted to engage a cross head 23 at 23A. The cross head 23 is fixedly secured to the rods 17 by set screws 24.

Mount heating and sealing jaws 25 and 26 are also disposed upon the rods 17 as follows. Ends 27 of the rods 17 pass through an opening 28 of ears 28A of the jaw 26 and are held thereto by cap nuts 29 and set screws 30 in a fixed position relative to the rods 17. The mount heating jaw 25 is slidably mounted on the rods 17 on bearings 31 formed in its ears 32, referring to Figures 6 and 8.

Referring now to Figure 1, there is formed on one side of the frame 16 a jaw back stop 33. Springs 34 have one of their ends contacting the frame 16 and their opposite ends contacting the rear of the jaw 25, tending to force the jaw 25 away from the back stop 33 of the frame 16. The amount of movement of the jaw 25 is determined by the bolts 35, which are threaded into threaded openings 36 of the ears 32, forming part of the jaw 25. The stud bolts 35 pass through the frame 16 and are held in adjustable position relative thereto by locking nuts 37. By the adjusting of the nuts 37, space 38 between the jaw 25 and the back stop 33 can be varied, limiting the movement of the jaw 25 along the rod 17 towards the back stop 33, which will be more fully described later on.

The cross head 23 is moved towards the piston rod 22 by the action of springs 39, having one of their ends bearing against the frame 15, and their opposite ends against the cross head 23. This action maintains the heat jaws 25 and 26 in spaced relation with respect to one another until the cylinder 19 is operated, closing the jaws 25 and 26 into mount sealing position. The cylinder 19 receives air from a supply line 40 through a magnetic control valve 41 and pipe 42, referring particularly to Figures 1, 2 and 11.

The mount heating and sealing jaws 25 and 26 will now be described. The mount M is of well known structure consisting of frames 43 and 43A hinged along an edge 43B. The frames 43 and 43A have a window or opening 43C located centrally thereof. A transparency 44 to be mounted is placed between the frames 43 and 43A within the raised guides 45. The frames 43 and 43A are then brought together and the mount M placed between faces 46 and 47 of the heat jaws 25 and 26, as best illustrated in Figure 9. The faces 46 and 47 of the jaws 25 and 26 extend beyond a body portion 48 of the jaws 25 and 26 and register with the frames 43 and 43A of the mounts M. A special sealing agent exists on the inner faces of the frames 43 and 43A of the mount which will when heated and pressed together seal the mount together, as illustrated in Figure 4.

Upwardly extending guides 49 form part of the faces 46 and 47 of the heating and sealing jaws 25 and 26. The jaw 26 has guides 50 formed along its edges adapted to embrace the sides of the extending face 46 of the jaw 25, referring particularly to Figures 1 and 9. The guides 50 also perform another duty, and that is to limit the travel forward of the jaw 26 towards the jaw 25 in the event the device is cycled without having a mount in place. This protects the numbers on the face of the disk 56 preventing them from being injured. Both the heating jaws 25 and 26 have heating elements 51 which are adapted to be positioned in the sockets 52, referring particularly to Figure 8. The elements 51 are controlled thermostatically by the thermostat 53 which is fixedly secured to the heat sealing jaw 25 for controlling and operating the heat developed within the jaws 25 and 26.

I will now describe the numbering feature of the device. A shaft 54 runs longitudinally of the device and is journalled within bearings 55 located within the frames 15 and 16, referring particularly to Figure 2. A numbering disk 56 is fixedly secured to the shaft 54 by a set screw 57. The disk 56 may be manually revolved by a knob 58, or it can be automatically revolved by a ratchet wheel 59, which is keyed to the shaft 54, each time a mount M is passed through the device, referring to Figures 1, 2 and 5, particularly.

Referring to Figure 1, a bell crank 60 is pivotally mounted at 61 to a bracket 62, which in turn forms part of the frame 16. The arm 63 of the bell crank 60 is operated by the cross head 23 by an adjustable clip 64 each time the cross head 23 moves with the rods 17. An opposite arm 65 of the bell crank 60 is pivotally connected to a pawl 66 at 67, referring to Figure 5. The opposite end of the pawl 66 is pivotally connected at 68 to a link 69. The link 69 is pivotally connected to a crank 70 at 71. The crank 70 forms part of a control rod 72, which is journalled at 73 and having its opposite end journalled within a case 74 at 75, terminating in a control knob 76. The knob 76 has a pointer 77 which registers with an indicating mark 78.

The pawl 66 consists of a tooth 79 which is adapted to engage ratchet teeth 80 of the ratchet wheel 59. The object of which will be described below. Indicia 81 are formed on the face of the disk 56. The face 46 of the heating and sealing jaw 25 is cut back and away at 82 and is adapted to receive the upper corner of the disk 56, as best illustrated in Figure 6.

The mount heat sealing jaw 26 will be moved towards the jaw 25 bringing the mount against the face of a number 83. The heat sealing jaw 25 will begin to travel with the jaw 26 receeding from the rear side of the disk 56 towards the stop 33. It is at this time that the number will be printed upon the face of the mount M and in order to take the stress of this printing pressure, a stop 84 which is adjustably threaded into the frame 16, referring particularly to Figure 7, will resist this pressure by bearing against the rear face of the disk 56. The adjustment of the stop 84 is such that the disk 56 is permitted to revolve freely but will be solidly backed up when the printing takes place by pressure exerted from the jaw 26.

As both jaws 25 and 26 are moved forward in the above described movement, a punch 85 which is adjustable to the face of the stop 33, and also through an opening 86 of the jaw 25 will pass through the edge of the mount M and into an opening within the oppositely disposed jaw 26, notching the mount at 87.

A spring 88 bears against an end 89 of the punch 85 within a socket 33A of the stop 33 at its one end, and against the rear surface of the jaw 25 at its opposite end. This will keep the end of the punch 85 retracted from between the jaws 25 and 26 and the mount M until pressure is applied at the end of the movement of the jaw 25 towards the stop 33, permitting the insertion of the mounts M between the jaws 25 and 26 before punching the same and the dropping through of the mount M after sealing, printing and punching the same. This will be more fully understood from the description to follow.

I will now describe the operation of the electrical portion of the device, referring particularly to Figure 11. The electric supply lines are indicated by numerals 91 and 92. A master switch 93 is provided for turning the device on through a fuse box 94. Energy will then flow into a conductor 95 through an indicating light 96, back to a line 92, of a light 96 indicating that the main switch 93 is closed. Energy will also flow from the conductor 95 through an indicating light 97, through a relay coil 98 of the relay R, through a thermostat switch 53, back to the line 92 through a conductor 99. This will close a switch 100 bringing energy through a line 101 into the heating elements 51 back to line 92 by the conductor 99.

The thermostat 53 is fixedly secured to the side of the heating jaw 25 and when the temperature thereof has risen to the proper predetermined amount, the thermostat 53 will open, opening the relay R, which will also darken the indicating light 97 indicating that the heating elements 51 have been turned off. The machine is now ready to operate. When the mount M is to be sealed it is dropped between the jaws 25 and 26, the switch 102 will then be closed by the operator. This will start a preset timing device 103 which will receive its energy from the line 101 and will deliver energy through conductors 104 to the magnetic air control valve 41 for a predetermined period of time, when the timer 103 will automatically shut off.

I will now describe the complete operation of my new and improved device for mounting film transparencies. The above electric circuit will be operated as described. When the timer switch 102 is closed, the timer 103 will open the magnetic air valve 41 allowing air to enter from the supply line 40 through the valve 41 through the line 42, into the cylinder 19. This forces the piston rod 22 in the direction of the arrow, together with the cross head 23 and the rods 17, pulling the face 47 of the jaw 26 towards the face 46 of the jaw 25. The heat from the faces of the jaws 25 and 26 will seal the mount M while the jaws 25 and 26 are pressing the frames 43 of the mounts M together. While this happens one of the corners of the mount M will register with the number 83 located on the face of the disk 56, printing whatever this number 83 is onto the corner of the mount M.

After the jaws 25 and 26 have moved towards the stop 33, the punch 85 will notch the corner of the mount M as at 87. When the mount M has been sealed by the predetermined timer 103, the magnetic air valve 41 will close shutting off the air supply from the pipe 40 to the air cylinder 19 and exhausting the air back to the atmosphere, allowing the springs 39 to return the cross head 23 and rods 17 to the position shown in Figures 1 and 2, allowing the jaws 25 and 26 to open, at which time the mount M will drop down into the chute C, referring to Figure 2, where it will be delivered to containers or conveyor belts, not here shown.

At the completion of the cycle of operation, another cycle may be repeated when the mount M is placed between the jaws 25 and 26 it will hold itself between the jaws 25 and 26 by its tendency to spring open so that when the fingers of the operator pushes the mount M into sealing position, it will remain there until sealed, at which time it will drop freely from between the jaws 25 and 26.

The disk 56 can be operated in three different ways. The position shown in Figure 5 would indicate that on each movement of the cross head 23 the pawl 66 will move the ratchet wheel 59 the distance of one tooth 80, thereby revolving the disk 56 the distance of one digit at a time automatically. In the event the operator desires to reset or correct the numbering disk 56 he will rotate the knob 76, which will raise the tooth 79 with the pawl 66 so that he can rotate the disk 56 to the number 83 he desires to reset in regards to the mount M, after which he can allow the pawl 66 to drop back into automatic feed position by releasing the knob 76. The knob 76 can be further rotated by bringing it into a position where it will remain holding the tooth 79 of the pawl 66 out of engagement with the teeth 80 of the ratchet wheel 59 until further released by the operator.

The object of this position is to make repeated seals without printing the numbers 83 on the mounts M. One of the numbers 83 has been left blank in regards to the face of the printing disk 56 in order to make repeated seals without numbering the mounts M.

Referring to Figure 6, an inking roller 105 is provided for inking the numerals 81 in the event ink is used for printing the number upon the surface of the mount M.

In some cases it may be desirable not to notch the mounts M.

Reference to numbers means any identifying indicia and not necessarily numerals per se.

Having thus described the preferred embodiment of the invention, it should be understood that numerous structural modifications and adaptations may be resorted to without departing from the scope of the appended claims.

What is claimed is:

1. A device for mounting film transparencies in framing mounts comprising a frame, a first jaw mounted in said frame, a second jaw mounted in said frame in facing relation to said first jaw, a punch carried by said frame extending through said first jaw, said second jaw having an aperture cooperating with said punch, said first jaw having an arcuate recess formed in the side thereof adjacent said second jaw, a numbering disk, means mounting said numbering disk on said frame for rotation thereon with an edge portion of said disk adjustably positioned in said recess, a plurality of numbering die members formed in one face of said disk adjacent the peripheral edge thereof, guide members on said jaws for guiding a transparency and its respective mount into mounting position between said jaws, and means on said frame for reciprocating said second jaw toward said first jaw to simultaneously mount said transparency in said framing mount, punch an orienting mark in said mount and die stamp an identifying number in said mount.

2. A device as claimed in claim 1 wherein electrical heating means is provided in each of said jaws for heat sealing said mount.

3. A device as claimed in claim 1 wherein said first jaw and said second jaw are each movably mounted in said frame, means in said frame for positively moving said second jaw toward said first jaw, and means in said frame normally biasing said first jaw toward said second jaw.

4. A device as claimed in claim 1 wherein manually controlled means are provided for rotating said disk to vary the identifying number stamped on said mount.

5. A device as claimed in claim 1 wherein means actuated by said jaw reciprocating means is provided for indexing said disk to vary the identifying number stamped on successive mounts.

6. A device for mounting film transparencies in framing mounts, said device comprising a frame, a first jaw mounted in said frame, a second jaw mounted in confronting relation to said first jaw, said first jaw having a recess in a side thereof, a movable identifying symbol applying means carried by said frame and adapted to be brought into position within said recess for applying a selected one of said symbols to a framing mount, guide means on said jaws for guiding a transparency and a mount therefor into mounting position between said jaws, and means on said frame for moving one of said jaws towards the other to simultaneously mount said transparency in its framing mount and apply an identifying symbol to said mount.

7. A device for mounting film transparencies in framing mounts comprising a frame, a first jaw mounted in said frame, a second jaw mounted in said frame in facing relation to said first jaw, said first jaw having an arcuate recess formed in the side thereof adjacent said second jaw, a numbering disk, means mounting said numbering disk on said frame for rotation thereon with an edge portion of said disk adjustably positioned in said recess, a plurality of numbering die members formed in one face of said disk adjacent the peripheral edge thereof, guide members on said jaws for guiding a transparency and its respective mount into mounting position between said jaws, and means on said frame for reciprocating said second jaw toward said first jaw to simultaneously mount said transparency in said framing mount, and die stamp an identifying number in said mount.

8. A device as claimed in claim 7 wherein electrical heating means is provided in each of said jaws for heat sealing said mount.

9. A device as claimed in claim 7 wherein said first jaw and said second jaw are each movably mounted in said frame, means in said frame for positively moving said second jaw toward said first jaw, and means in said frame normally biasing said first jaw toward said second jaw.

10. A device as claimed in claim 7 wherein manually controlled means are provided for rotating said disk to vary the identifying number stamped on said mount.

11. A device as claimed in claim 7 wherein means actuated by said jaw reciprocating means is provided for indexing said disk to vary the identifying number stamped on successive mounts.

References Cited in the file of this patent

UNITED STATES PATENTS

| | | |
|---|---|---|
| 2,597,634 | Grevich | May 20, 1952 |
| 2,690,021 | Langan | Sept. 28, 1954 |
| 2,751,072 | Ditmar | June 19, 1956 |